United States Patent
Sato et al.

(10) Patent No.: US 10,414,300 B2
(45) Date of Patent: Sep. 17, 2019

(54) SEAT SLIDING APPARATUS FOR A VEHICLE

(71) Applicant: AISIN SEIKI KABUSHIKI KAISHA, Kariya-shi (JP)

(72) Inventors: Takanori Sato, Kasugai (JP); Yasuhiro Kojima, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/749,520

(22) PCT Filed: Jun. 16, 2016

(86) PCT No.: PCT/JP2016/068001
§ 371 (c)(1),
(2) Date: Feb. 1, 2018

(87) PCT Pub. No.: WO2017/022341
PCT Pub. Date: Feb. 9, 2017

(65) Prior Publication Data
US 2018/0215289 A1    Aug. 2, 2018

(30) Foreign Application Priority Data
Aug. 6, 2015  (JP) ................. 2015-156503

(51) Int. Cl.
*B60N 2/42*    (2006.01)
*B60N 2/07*    (2006.01)

(52) U.S. Cl.
CPC .......... *B60N 2/4221* (2013.01); *B60N 2/073* (2013.01); *B60N 2/0705* (2013.01);
(Continued)

(58) Field of Classification Search
CPC .......... B60N 2/4221; B60N 2/06; B60N 2/07; B60N 2/0705; B60N 2/073; B60N 2/0745; B60N 2/42
(Continued)

(56) References Cited

U.S. PATENT DOCUMENTS 6,138,974 A    10/2000 Okada et al.
7,503,614 B2 *   3/2009 Yamada ............... B60N 2/0705
                                                              248/429

(Continued)

FOREIGN PATENT DOCUMENTS

JP      11-59238 A      3/1999
JP    2006-273175 A    10/2006

OTHER PUBLICATIONS

English translation of the International Preliminary Report on Patentability and Written Opinion of the International Searching Authority dated Feb. 6, 2018 in PCT/JP2016/068001 filed Jun. 16, 2016, 6 pages.

(Continued)

Primary Examiner — Joseph D. Pape
(74) *Attorney, Agent, or Firm* — Oblon, McClelland, Maier & Neustadt, L.L.P.

(57) ABSTRACT

A vehicle seat sliding apparatus includes an upper rail that supports a seat at an upper side, a lower rail that supports the upper rail to be relatively movable manner in a longitudinal direction of the upper rail, and a lock mechanism configured to restrain the upper rail from moving relative to the lower rail. The upper rail includes two side walls that are opposed in a width direction of the upper rail and an upper wall that connects the two side walls. The upper wall has a plurality of seat fasteners. The upper rail has at least one hole between a longitudinal end of the upper rail and one of the seat (Continued)

fasteners closest to the longitudinal end. The hole is a cutout formed in each of the two side walls and the upper wall.

8 Claims, 6 Drawing Sheets

(52) U.S. Cl.
CPC ......... *B60N 2/0715* (2013.01); *B60N 2/0732* (2013.01); *B60N 2/0745* (2013.01)

(58) Field of Classification Search
USPC ...................................... 296/65.13; 248/429
See application file for complete search history.

(56) References Cited

U.S. PATENT DOCUMENTS

| | | | |
|---|---|---|---|
| 2010/0207419 A1* | 8/2010 | Kojima | B60N 2/0727 296/65.13 |
| 2014/0224954 A1* | 8/2014 | Oh | B60N 2/0705 248/429 |
| 2015/0306981 A1* | 10/2015 | Arakawa | B60N 2/0705 248/429 |

OTHER PUBLICATIONS

International Search Report dated Sep. 20, 2016 in PCT/JP2016/068001 filed Jun. 16, 2016.

* cited by examiner

SEAT SLIDING APPARATUS FOR A VEHICLE

TECHNICAL FIELD

The present invention relates to a vehicle seat sliding apparatus.

BACKGROUND ART

A typical vehicle seat sliding apparatus includes an upper rail and a lower rail. The upper rail supports a seat at an upper side, and the lower rail supports the upper rail so as to be relatively movable in the longitudinal direction of the upper rail. Patent document 1 describes an example of a seat sliding apparatus of which the upper rail includes two side walls opposed to each other in the widthwise direction of the upper rail and an upper wall that connects the two side walls. The upper wall includes a plurality of bolts functioning as seat fasteners (refer to FIG. 3 of patent document 1).

A seat sliding apparatus such as that described above usually includes a lock mechanism that allows for switching between a state in which movement of the upper rail relative to the lower rail is restricted and a state in which movement of the upper rail relative to the lower rail is permitted. This allows the slide position of the seat to be adjusted and the seat to be held in place at the adjusted slide position.

PRIOR ART DOCUMENT

Patent Document

Patent Document 1: Japanese Laid-Open Patent Publication No. 2006-273175

SUMMARY OF THE INVENTION

Problems that are to be Solved by the Invention

When a large load is input to the seat in the sliding direction, a force acts on the upper rail supporting the seat so as to separate the upper rail from the lower rail (tearing load). For example, during a frontal collision of the vehicle, frontward inertial force acts on the seat. This applies force upwardly pulling the seat fastener on the upper wall that is located at the rear end side of the upper wall. In the conventional seat sliding apparatus, the stress produced by the tearing load concentrates at the portion where the longitudinal end of the upper rail abuts against the lower rail. In this respect, there is still room for improvement.

It is an object of the present invention to provide a vehicle seat sliding apparatus that reduces stress concentration during the input of a tearing load and ensures reliability.

Means for Solving the Problem

A vehicle seat sliding apparatus including an upper rail that supports a seat at an upper side, a lower rail that supports the upper rail to be relatively movable manner in a longitudinal direction of the upper rail, and a lock mechanism configured to restrict movement of the upper rail relative to the lower rail. The upper rail includes two side walls that are opposed in a widthwise direction of the upper rail and an upper wall that connects the two side walls. The upper wall includes a plurality of seat fasteners, and the upper rail includes at least one hole between a longitudinal end of the upper rail and one of the seat fasteners closest to the longitudinal end. The hole is a cutout formed in each of the two side walls and the upper wall.

EMBODIMENTS OF THE INVENTION

One embodiment of a vehicle seat sliding apparatus 10 will now be described with reference to the drawings.

Figure 1:
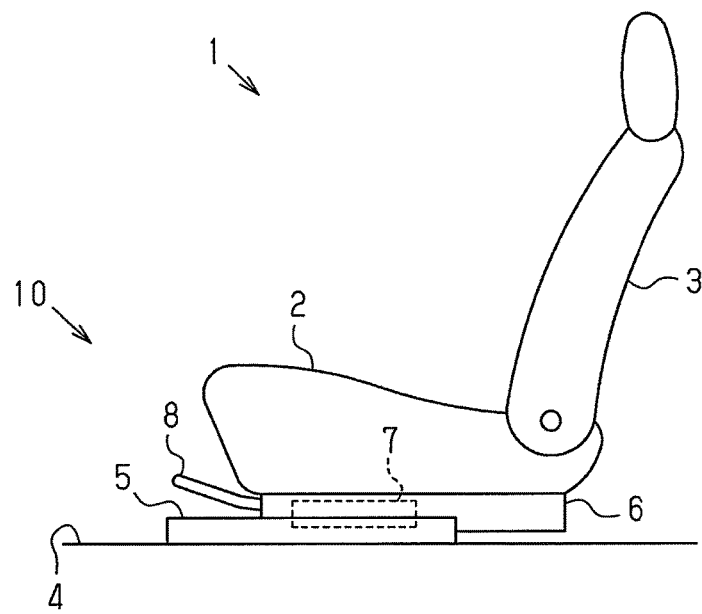
FIG. 1 is a schematic diagram showing the structure of a seat sliding apparatus.
Figure 2:
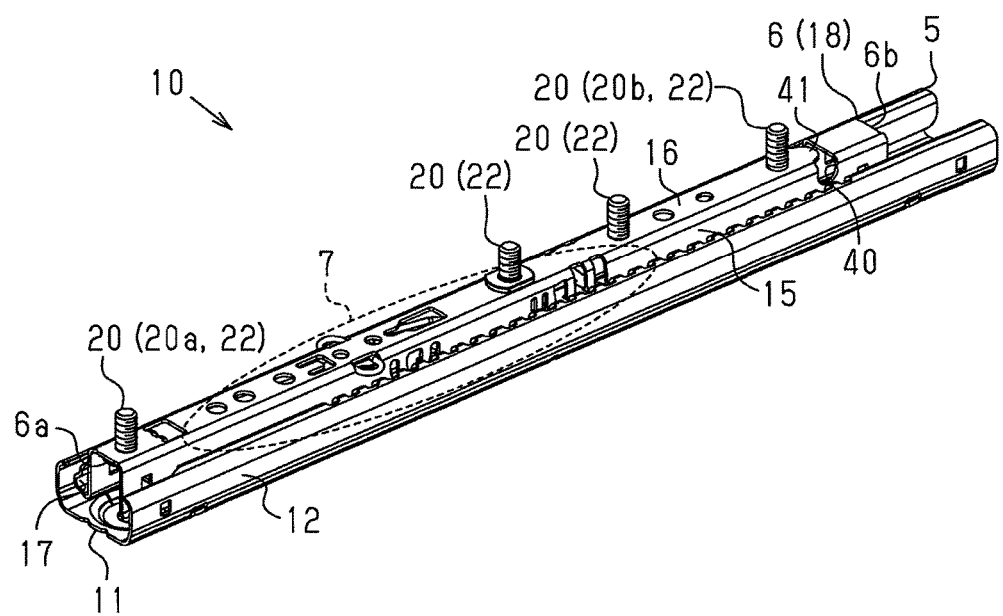
FIG. 2 is a perspective view of a main portion of the seat sliding apparatus shown in FIG. 1.

As shown in FIG. 1, a vehicle seat 1 includes a seat cushion 2 and a seat back 3 that is inclinable relative to the rear end of the seat cushion 2. Further, as shown in FIGS. 1 and 2, the floor 4 of the vehicle includes two lower rails 5, a left one and a right one, extending in the front-rear direction of the vehicle. FIG. 2 shows only one of the lower rails 5. An upper rail 6 is mounted on each lower rail 5 and movable relative to the lower rail 5 in the longitudinal direction of the lower rail 5. The seat 1 is supported at the upper side of the upper rails 6.

A lock mechanism 7 arranged between the lower rails 5 and the upper rails 6 is switchable between a state in which the lock mechanism 7 restricts movement of the upper rails 6 relative to the lower rails 5 and a state in which the lock mechanism 7 permits movement of the upper rails 6 relative to the lower rails 5. The lock mechanism 7 is of a known structure in which a loop handle 8 is lifted to switch between a lock state that restricts relative movement of the upper rails 6 and an unlock state that permits relative movement of the upper rails 6. In the present embodiment, the lower rails 5 and the upper rails 6 form the seat sliding apparatus 10 that allows the slide position of the seat 1 to be adjusted in the front-rear direction of the vehicle.

Figure 3:
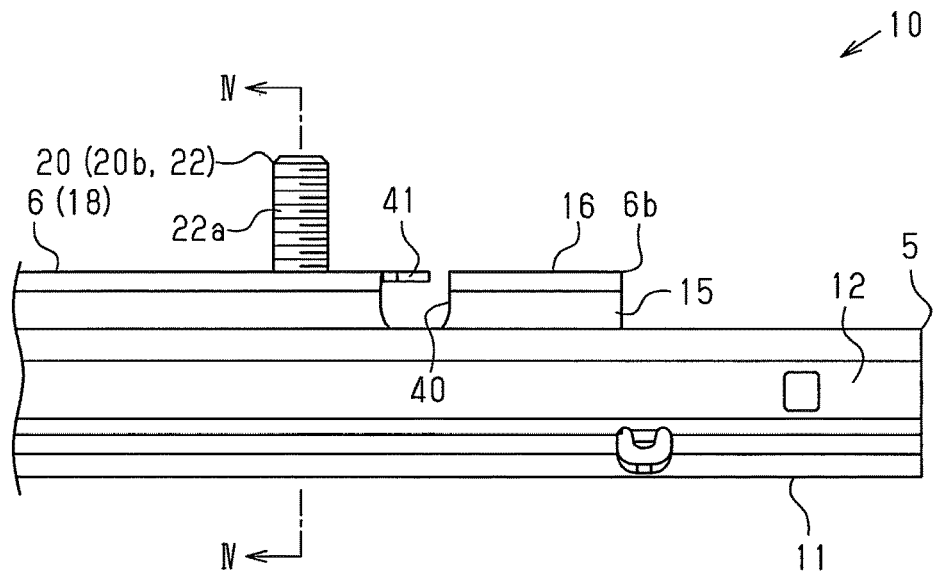
FIG. 3 is a side view of the seat sliding apparatus shown in FIG. 2 in the vicinity of a rear end of an upper rail.
Figure 4:
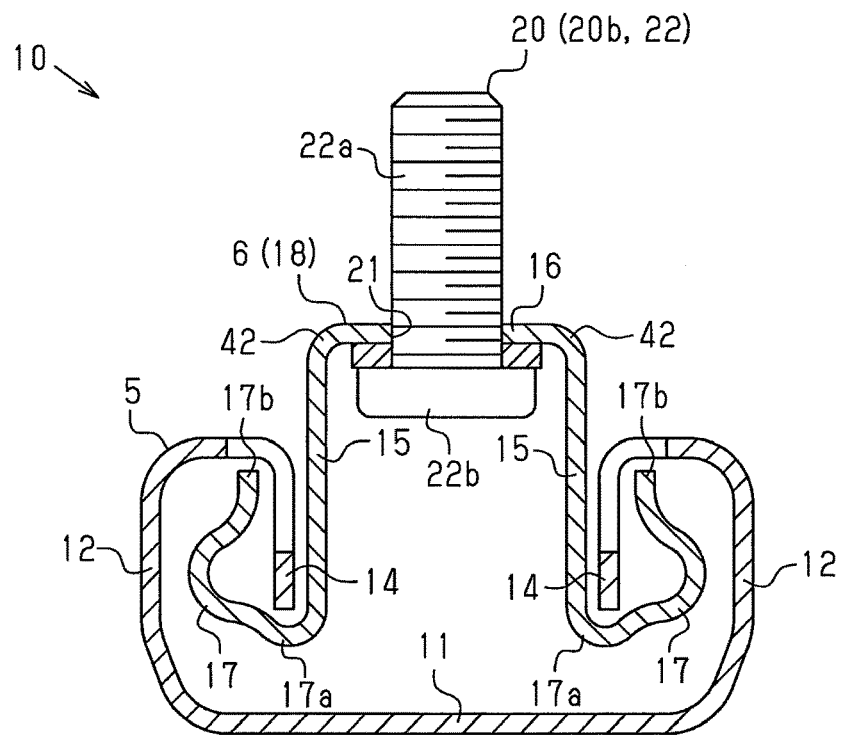
FIG. 4 is a cross-sectional view taken along line IV-IV in FIG. 3.

In detail, as shown in FIGS. 2 to 4, the lower rail 5 includes a flat bottom wall 11 that is a fixed portion fixed to the floor 4 of the vehicle (refer to FIG. 1). Further, an outer wall 12 extends upward from each of the two widthwise ends of the bottom wall 11 (left and right ends as viewed in FIG. 4). Upper walls extend inward in the widthwise direction of the lower rail 5 from the upper ends of the outer walls 12 (as viewed in FIG. 4), and inner walls 14 extend downward from the distal ends of the upper walls.

The upper rail 6 includes two side walls 15 and a plate-like upper wall 16 connecting the two side walls 15. Folded portions 17 extend from the lower ends of the side walls 15 in a state folded upwardly and toward the outer side of the upper rail 6 in the widthwise direction of the upper rail 6 from the side walls 15.

The two side walls 15 and the upper wall 16 of the upper rail 6 form a main body 18 having a channel-shaped cross section. The upper rail 6 is coupled to the lower rail 5 with the main body 18 located between the two inner walls 14 of the lower rail 5. The folded portions 17 at the lower ends of the side walls 15 of the upper rail 6 are each located in an open space surrounded by the corresponding outer wall 12 and inner wall 14 of the lower rail 5. This restricts movement of the upper rail 6 relative to the lower rail 5 in the upward direction and the widthwise direction.

A plurality of balls (steel balls), which are not shown in the drawings, are located between each outer wall 12 of the lower rail 5 and the corresponding folded portion 17 of the upper rail 6 that are opposed in the widthwise direction of the lower rail 5. The balls contact and roll on the outer walls 12 of the lower rail 5 and the folded portions 17 of the upper rail 6 to ensure smooth sliding of the upper rail 6 relative to the lower rail 5.

The upper rail 6 includes a plurality of seat fasteners 20 on the upper wall 16. More specifically, the seat fasteners 20 are formed by inserting bolts 22 into insertion holes 21 in the upper wall 16 of the upper rail 6 with threaded shafts 22a projecting upward from the upper wall 16 (toward upper side as viewed in FIGS. 3 and 4). In the present embodiment, welding is performed to fix the bolt heads 22b of the bolts 22 to the upper wall 16 of the upper rail 6. The seat fasteners 20, or the bolts 22, are aligned in the longitudinal direction of the upper rail 6. The seat 1 can easily be fixed to the upper rail 6 by using the seat fasteners 20.

Tearing Load Dispersion Structure

A tearing load dispersion structure included in the seat sliding apparatus 10 of the present embodiment will now be described.

Figure 5:
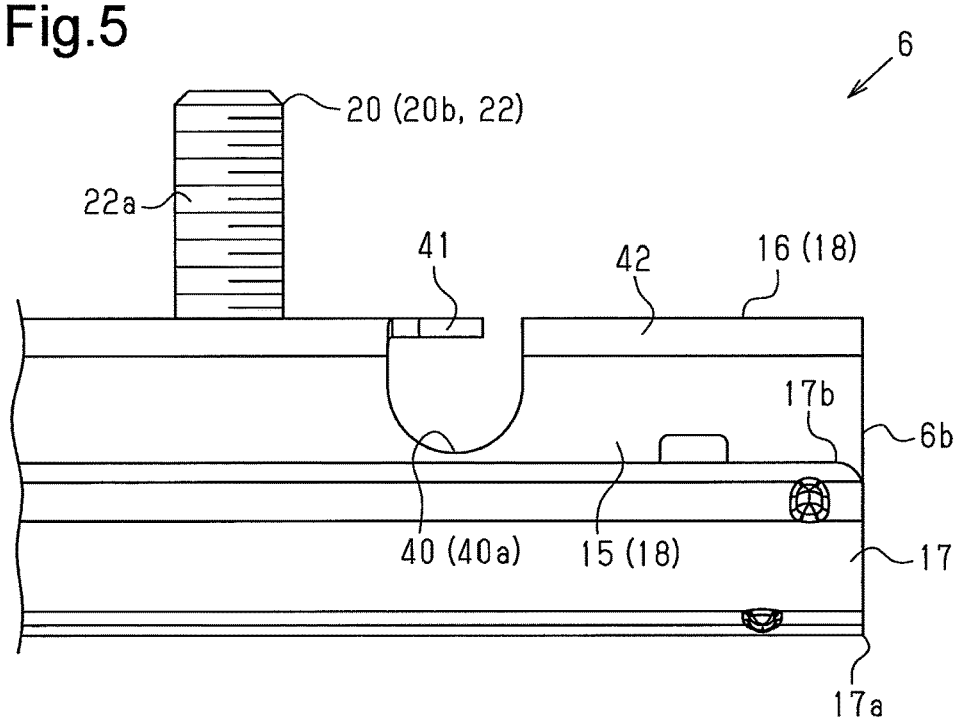
FIG. 5 is a side view showing the vicinity of the rear end of the upper rail.
Figure 6:
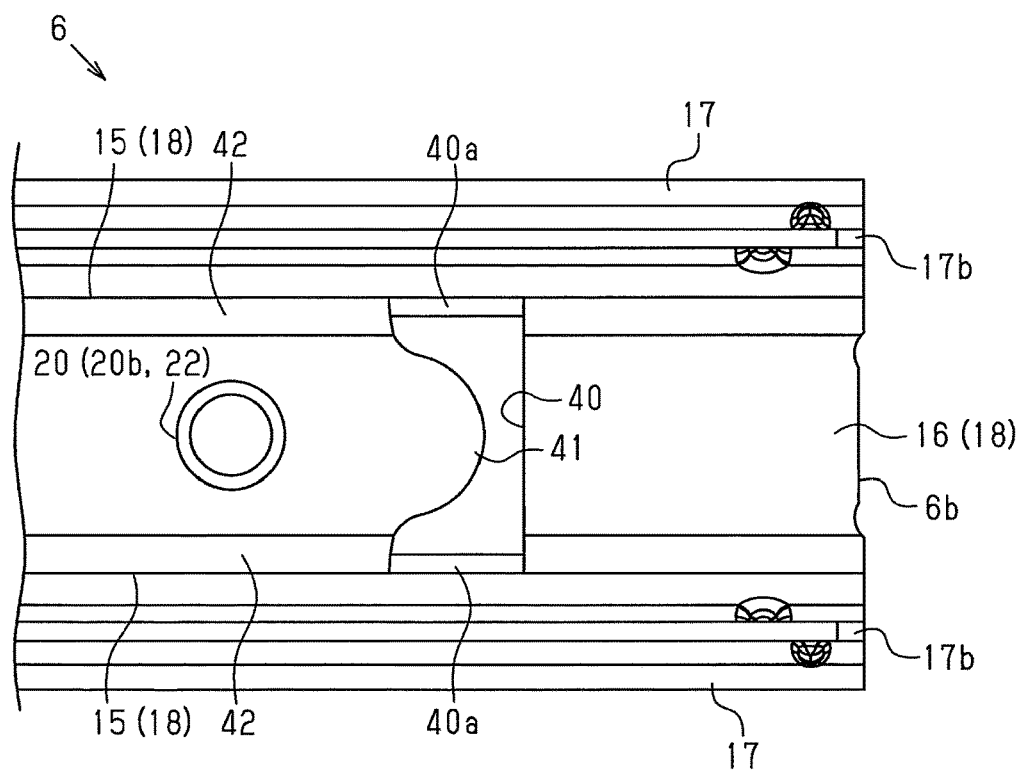
FIG. 6 is a plan view showing the vicinity of the rear end of the upper rail.

As shown in FIGS. 5 and 6, the upper rail 6 includes a hole 40 that is located between a rear end 6b of the upper rail 6 and the seat fastener 20b closest to the rear end 6b and formed by continuously cutting out the upper wall 16 and the two side walls 15. The hole 40 is a slit continuously extending over the upper wall 16 and the two side walls 15. More specifically, the hole 40 extends in the widthwise direction of the upper rail 6 (vertical direction as viewed in FIG. 6) and divides the upper wall 16 in its longitudinal direction. Further, the hole 40 extends downward from the two widthwise ends of the upper wall 16 along the two side walls 15. A corner 42 formed at the boundary between each side wall 15 and the upper wall 16 is divided by the hole 40 in the longitudinal direction of the upper rail 6. The portion of the hole 40 in each side wall 15 has a distal end defining an edge 40a that has a curved shape such as a semi-circle.

The hole 40 is located in the vicinity of the rearmost seat fastener 20b (bolt 22) of the upper rail 6. The upper wall 16 of the upper rail 6 includes a bulge 41 that extends toward the rear end 6b of the upper rail 6 from the edge of the hole 40 that is closer to the seat fasteners 20 (left side as viewed in FIGS. 5 and 6).

The bulge 41 also has the form of a substantially semi-circular plate. Thus, the edges defining the hole 40 is free from an acute portion.

The operation of the hole 40 of the upper rail 6 will now be described with reference to FIGS. 7 to 10. In the drawings, the broken lines with arrowheads show a load transmission path formed in the upper rail 6 when a tearing load F is input to the rearmost seat fastener 20b. In each drawing, the portion encompassed by the single-dashed lines is where the stress produced by the input tearing load F is greater than the surrounding.

Figure 7:
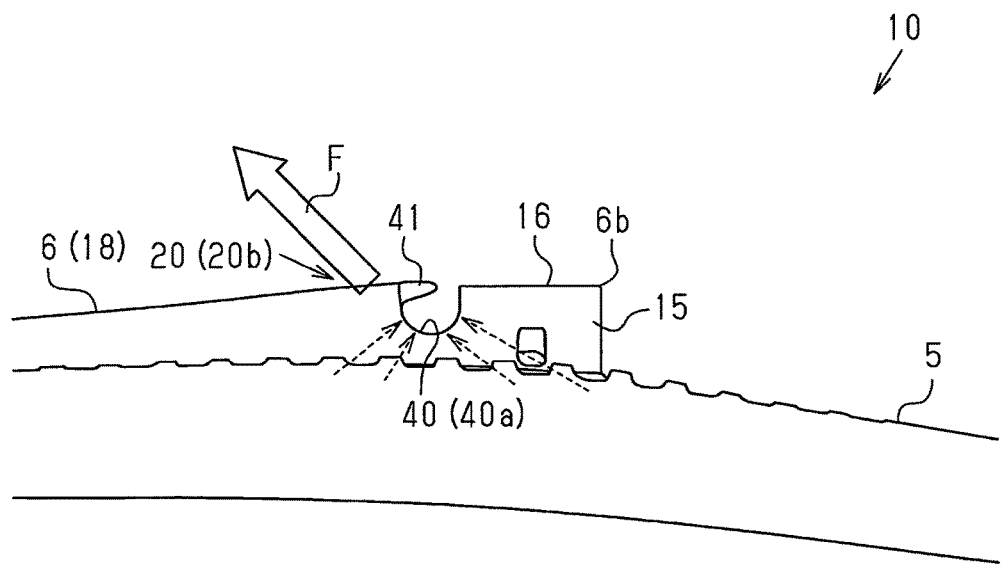
FIG. 7 is a side view showing the upper rail in a state in which a tearing load is input.
Figure 8:
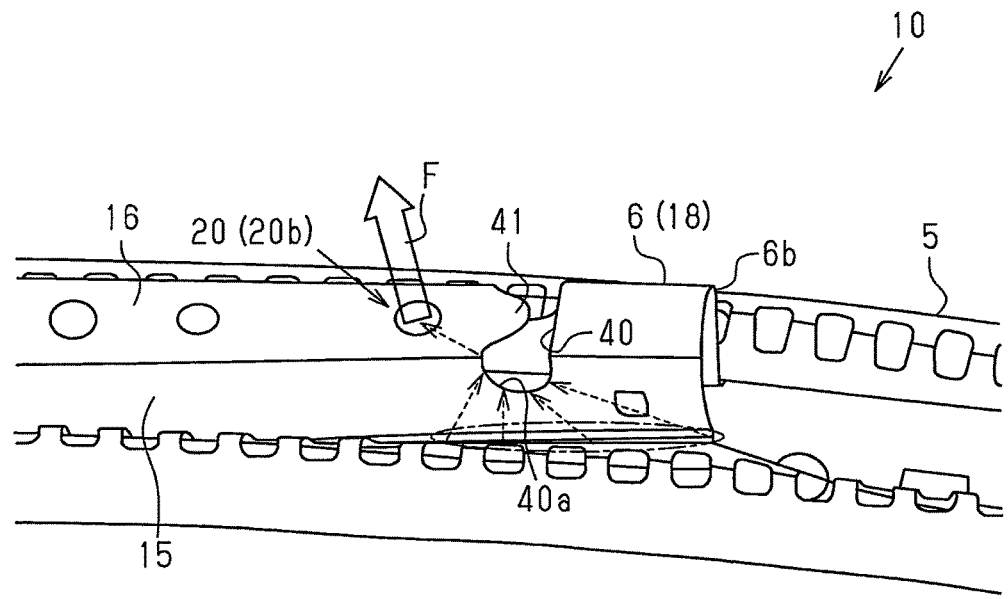
FIG. 8 is a perspective view showing the upper rail in a state in which tearing load is input.

As shown in FIGS. 7 and 8, for example, when a frontal collision or the like of the vehicle occurs and a large load acting to forwardly move the seat 1 is input to the seat 1, a force is applied to the upper rail 6 and acts to separate the upper rail 6 from the lower rail 5 and lift the rear end 6b of the upper rail 6. In such a case, the hole 40 functions to disperse the tearing load F, which is input to the upper rail 6 via the seat fastener 20b, in the longitudinal direction of the upper rail 6.

More specifically, the upper rail 6, which includes the main body 18 having a substantially channel-shaped cross section, easily bends in the vertical direction about the cutout (hole 40), which is formed by cutting out the two side walls 15 of the main body 18 in the vertical direction. Further, the cutout that is present at the boundary between each side wall 15 and the upper wall 16, that is, each corner 42 of the main body 18 results in further easy bending of the upper rail 6.

The cutout, or the hole 40, is formed in the upper rail 6 between the rear end 6b and the rearmost seat fastener 20b. The tearing load F input through the seat fastener 20b at the vicinity of the hole 40 can be dispersed in the longitudinal direction of the upper rail 6 by the bending of the upper rail 6 about the portion where the hole 40 is formed.

Figure 9:
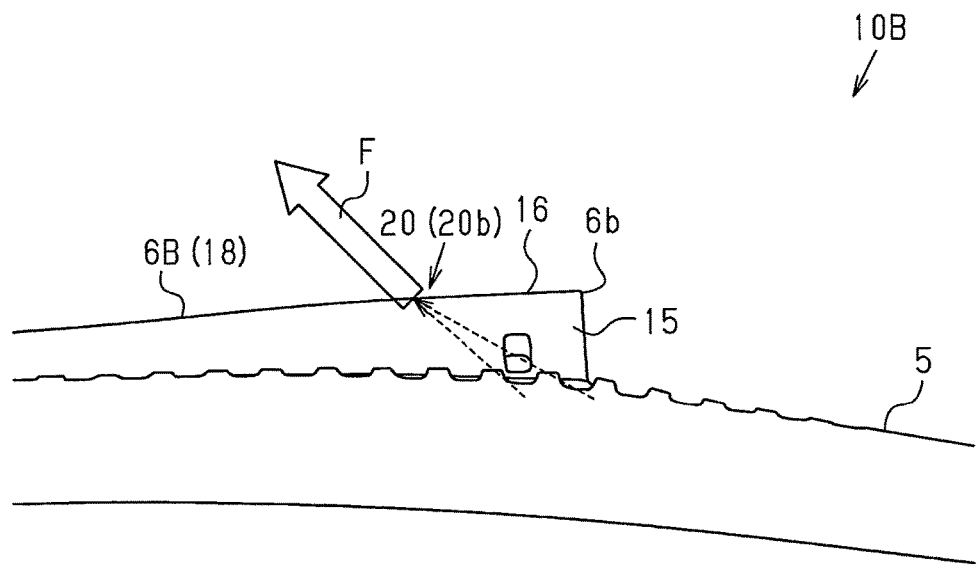
FIG. 9 is a side view showing a seat sliding apparatus of a comparative example that does not include holes in a state in which a tearing load is input.
Figure 10:
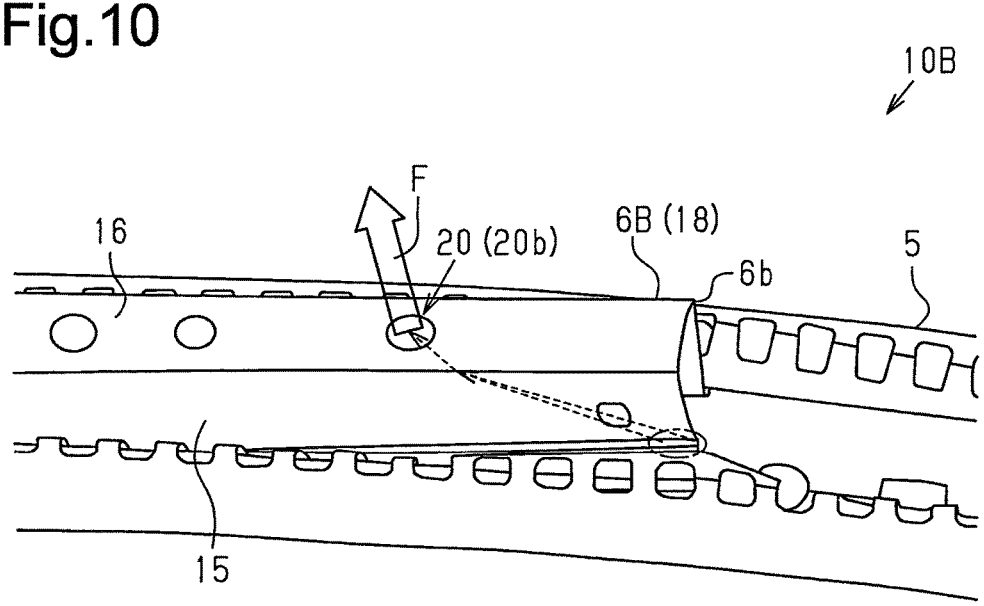
FIG. 10 is a perspective view showing a seat sliding apparatus of the comparative example that does not include holes in a state in which a tearing load is input.

In detail, FIGS. 9 and 10 show a seat sliding apparatus 10B of a comparative example that includes an upper rail 6B without the hole 40. In this case, the tearing load F that lifts the rearmost seat fastener 20b of the upper rail 6B is transmitted substantially straight to the rear end 6b, which is the portion of the upper rail 6B abut against the lower rail 5. In the upper rail 6B of this comparative example and the upper rail 6 of the present embodiment, the input of the tearing load F lifts the rear end 6b. Thus, a rearmost end portion of a basal part 17a and a distal part 17b of each folded portion 17 (refer to FIG. 4) is an abutment portion abut against the lower rail 5. The transmission of the tearing load F to the abutment portion results in the concentration of stress in the vicinity of the abutment portion.

In contrast, as shown in FIGS. 7 and 8, in the seat sliding apparatus 10 of the present embodiment, when the tearing load F is input, the upper rail 6 is bent in a substantially V-shaped manner about the portion where the hole 40 is formed. Thus, a wide range located downward from the hole 40 of the upper rail 6 serves as a transmission path of the tearing load F. This disperses the tearing load F, which is input to the upper rail 6 through the seat fastener 20b, over a relatively wide region including the rear end 6b of the upper rail 6. As a result, the concentration of stress is reduced when the tearing load F is input, and high reliability is ensured.

The present embodiment has the advantages described below.

(1) The seat sliding apparatus 10 includes the upper rail 6 that supports the seat 1 at the upper side, the lower rail 5 that supports the upper rail 6 to be relatively movable in the longitudinal direction, and the lock mechanism 7 that restricts movement of the upper rail 6 relative to the lower rail 5. Further, the upper rail 6 includes the two side walls 15 that are opposed in the widthwise direction and the upper wall 16 that is connected to the two side walls 15. The upper wall 16 also includes the seat fasteners 20 that are used to fasten the seat 1 to the upper rail 6. The upper rail 6 includes the hole 40 between the rear end 6b and the seat fastener 20b that is closest to the rear end 6b. The hole 40 is a cutout formed in each of the side walls 15 and the upper wall 16.

With the above structure, the upper rail 6 is bent in a substantially V-shaped manner about the portion where the hole 40 is formed to disperse the tearing load F input to the upper rail 6 via the seat fastener 20b over a relatively large region including the rear end 6b of the upper rail 6. This reduces the concentration of stress when the tearing load F is input and ensures high reliability.

(2) The hole 40 continuously extends over the upper wall 16 and the two side walls 15 of the upper rail 6. Thus, the upper rail 6 easily bends about the portion where the hole 40 is formed. This reduces the concentration of stress produced by the tearing load F and ensures high reliability.

(3) The seat fasteners 20 (20b) are the bolts 22 fixed to the upper wall 16 of the upper rail 6. This allows the seat 1 to be easily fixed when fastened to the bolts 22.

(4) The upper wall 16 includes the bulge 41 extending toward the rear end 6b of the upper rail 6 from the edge of the hole 40 that is closer to the seat fasteners 20. Thus, even though the hole 40 is formed at a position close to the seat fastener 20b (the bolt 22), the strength required for the seat fastener 20b is ensured. In particular, when the bolts 22 (bolt heads 22b) are welded to the upper wall 16, the portions around the bolts 22 have a tendency to become brittle because of the heat produced by welding. However, the welding does not overheat the bulge 41. This ensures the strength required for the seat fastener 20b.

(5) The edge 40a of the distal end of the portion of the hole 40 in each side wall 15 has a curved shape such as a semi-circle. Thus, the edge defining the hole 40 is shaped to be free from an acute portion in at least each side wall 15, and the stress produced by the tearing load F does not concentrate at the edges of the hole 40. This disperses the tearing load F, which is input to the upper rail 6 via the seat fastener 20b, in the longitudinal direction of the upper rail 6 from the portion where the rear end 6b abuts against the lower rail 5 in a further preferable manner.

(6) In the vehicle seat sliding apparatus, the hole is formed between the rear end of the upper rail and the seat fastener that is closest to the rear end. When a frontal collision of the vehicle occurs, a large tearing load is input to the upper rail such that the rear end of the upper rail is separated from the lower rail. The above structure reduces the concentration of stress produced by the input of the tearing load and ensures high reliability.

The above embodiment may be modified as described below.

Figure 11A:
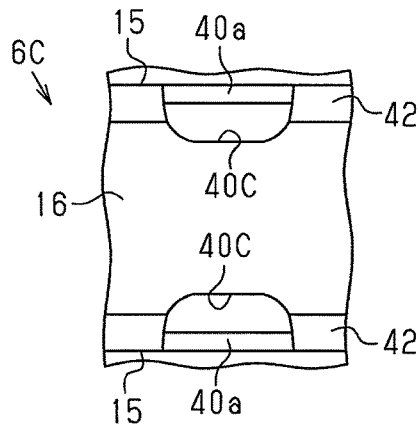
FIG. 11A is a plan view showing holes formed in the upper rail of a further example.
Figure 11B:
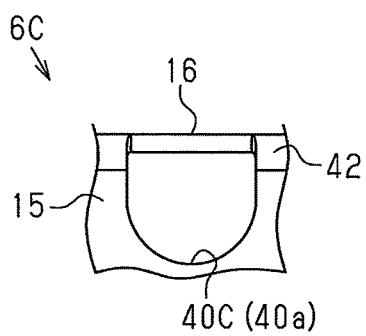
FIG. 11B is a side view of a hole shown in FIG. 11A.

In the above embodiment, the hole 40 is a cutout continuously extending over the upper wall 16 and the two side walls 15 of the upper rail 6. However, the hole 40 need only divide at least each corner 42 in the longitudinal direction of the upper rail 6. For example, as shown in FIGS. 11A and 11B, an upper rail 6C may include two holes 40C that are independent from each other and formed by partially cutting out the side walls 15 and the upper wall 16 between the rear end 6b and the seat fastener 20b closest to the rear end 6b. As viewed in FIGS. 11A and 11B and FIGS. 12A to 12D, which will be described later, the rear end 6b of the upper rail 6C (6D, 6E, 6F) is located toward the right side, and the seat fastener 20b and a front end 6a of the upper rail 6C (6D, 6E, 6F) are located toward the left side.

Figure 12A:
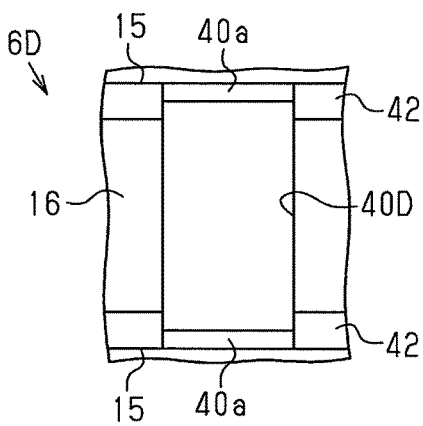
FIG. 12A is a plan view showing a hole formed in the upper rail of another example.
Figure 12B:
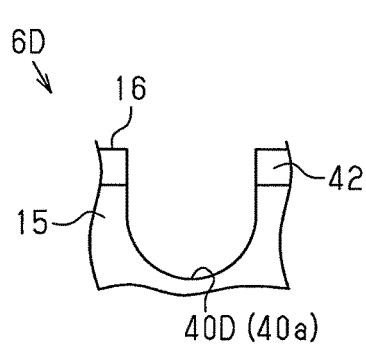
FIG. 12B is a side view of the hole shown in FIG. 12A.
Figure 12C:
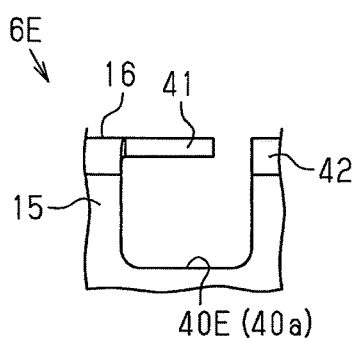
FIG. 12C is a side view showing a hole of a further example.
Figure 12D:
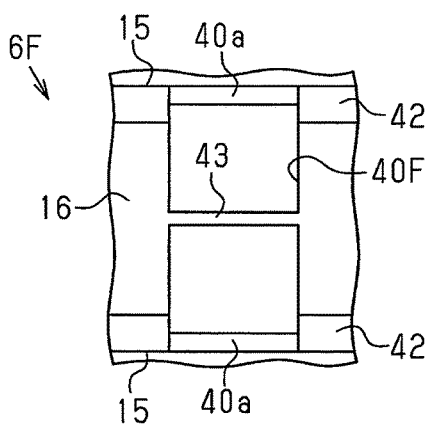
FIG. 12D is a plan view showing a hole of a further example.

Like the upper rail 6D shown in FIGS. 12A and 12B, the upper wall 16 does not have to include the bulge 41. The opposing edges of the hole 40D extend parallel to each other in the upper wall 16. Like the upper rail 6e shown in FIG. 12C, the edge 40a of the distal end of the portion of the hole 40 in each side wall 15 does not need to have a curved shape such as a semi-circle. Further, the bulge 41 does not need to be shaped to have the form of a semicircular plate. Nevertheless, it is preferable that the edge defining the hole 40E be shaped free from an acute portion in at least each side wall 15 so that stress does not concentrate at the edge of the hole 40E when the tearing load F is input. As shown in FIG. 12D, the upper wall 16 of the upper rail 6F may include a connection portion 43 that connects the front edge and the rear edge of the hole 40F.

In the above embodiment, the hole 40 may extend downward along the two side walls 15 so that the distal end of the edge 40a reaches each folded portion 17.

In the above embodiment, the upper rail 6 includes the hole 40 between the rear end 6b and the rearmost seat fastener 20b. Instead, the upper rail 6 may include a hole between the front end 6a (refer to FIG. 2) and the foremost seat fastener 20a. Alternatively, the upper rail 6 may include holes in the two longitudinal sides.

In the above embodiment, the bolts 22 are welded and fixed to the upper wall 16 of the upper rail 6. Instead, the bolts 22 may be fixed to the upper wall 16 in any manner such as by sandwiching the upper wall 16 between the bolt heads 22b and nuts. Further, the seat fasteners 20 may be formed by structures other than the bolts 22.

The invention claimed is:

1. A vehicle seat sliding apparatus comprising:
   an upper rail that supports a seat at an upper side;
   a lower rail that supports the upper rail to be relatively movable manner in a longitudinal direction of the upper rail; and
   a lock mechanism configured to restrict movement of the upper rail relative to the lower rail, wherein
   the upper rail includes two side walls that are opposed in a widthwise direction of the upper rail and an upper wall that connects the two side walls,
   the upper wall includes a plurality of seat fasteners, and one of the seat fasteners closest to a longitudinally rearmost end of the upper rail is a rearmost seat fastener,
   the upper rail includes a folded portion extending from a lower end of each of the two side walls in a state folded upwardly and toward an outer side in the widthwise direction of the upper rail from each of the two side walls,
   the folded portion includes a rearmost end portion that extends to the longitudinally rearmost end of the upper rail, and the rearmost end portion is an abutment portion that abuts against the lower rail when a tearing load that lifts the rearmost seat fastener is applied to the upper rail, and
   the upper rail includes at least one hole between the rearmost end portion of the folded portion and the rearmost seat fastener, wherein the at least one hole is a cutout formed in each of the two side walls and the upper wall.

2. The vehicle seat sliding apparatus according to claim 1, wherein the at least one hole continuously extends over the upper wall and the two side walls.

3. The vehicle seat sliding apparatus according to claim 2, wherein the upper wall includes a bulge that extends toward the longitudinally rearmost end of the upper rail from an edge of the at least one hole that is closer to the rearmost seat fastener.

4. The vehicle seat sliding apparatus according claim 1, wherein an edge defining the at least one hole is shaped to be free from an acute portion in at least each of the two side walls.

5. The vehicle seat sliding apparatus according claim 1, wherein the at least one hole is present in a corner formed at a boundary between the upper wall and each of the two side walls.

6. The vehicle seat sliding apparatus according claim 1, wherein the seat fasteners are bolts fixed to the upper wall.

7. The vehicle seat sliding apparatus according to claim 1, wherein the entire at least one hole is located between the rearmost end portion of the folded portion and the rearmost seat fastener in the longitudinal direction of the upper rail.

8. The vehicle seat sliding apparatus according to claim 1, wherein the upper rail is configured to be facilitated to bend about a portion where the hole is formed.

* * * * *